(12) United States Patent
Sabatier et al.

(10) Patent No.: US 9,497,273 B2
(45) Date of Patent: Nov. 15, 2016

(54) METHOD AND DEVICE FOR PAIRING A TERMINAL AND A USER ACCOUNT

(75) Inventors: Pierre Sabatier, Rueil Malmaison (FR); David Sartori, Rueil Malmaison (FR)

(73) Assignee: SAGEMCOM DOCUMENTS SAS, Rueil-Malmaison (FR)

( * ) Notice: Subject to any disclaimer, the term of this patent is extended or adjusted under 35 U.S.C. 154(b) by 34 days.

(21) Appl. No.: 13/991,253

(22) PCT Filed: Nov. 29, 2011

(86) PCT No.: PCT/EP2011/071230
§ 371 (c)(1),
(2), (4) Date: Aug. 20, 2013

(87) PCT Pub. No.: WO2012/072604
PCT Pub. Date: Jun. 7, 2012

(65) Prior Publication Data
US 2014/0297877 A1    Oct. 2, 2014

(30) Foreign Application Priority Data

Dec. 3, 2010 (FR) ..................................... 10 60051

(51) Int. Cl.
*G06F 15/16* (2006.01)
*H04L 29/08* (2006.01)
*H04L 29/12* (2006.01)

(52) U.S. Cl.
CPC ....... *H04L 67/142* (2013.01); *H04L 29/12528* (2013.01); *H04L 61/2575* (2013.01); *H04L 67/1095* (2013.01); *H04L 67/06* (2013.01)

(58) Field of Classification Search
CPC ................. H04L 67/1095; H04L 67/06; H04L 29/12428; H04L 61/2575
(Continued)

(56) References Cited

U.S. PATENT DOCUMENTS

2005/0054343 A1* 3/2005 Nykanen ............... H04W 80/04
455/432.3
2006/0136559 A1* 6/2006 Morris .............. G06F 17/30244
709/206
(Continued)

OTHER PUBLICATIONS

English language translation of Written Opinion of the International Searching Authority (Form PCT/IB/373) dated Jun. 4, 2013 (mailed Jun. 24, 2013).
(Continued)

*Primary Examiner* — Vivek Srivastava
*Assistant Examiner* — Atta Khan
(74) *Attorney, Agent, or Firm* — Nixon & Vanderhye P.C.

(57) ABSTRACT

A pairing must be performed between a terminal, referred to as terminal to be paired, and a user account for a service implemented by at least one device connected to a first communication network. The terminal to be paired is connected via a second communication network to a gateway which interconnects the first and second communication networks by performing an address translation by means of a public address routable on the first communication network. A pairing device performs steps: of obtaining (3.2) said public address; of detecting (3.4) an access to said user account, said access being performed from another terminal (1.2), distinct from the terminal to be paired; of obtaining (3.5) the address of said other terminal; of pairing (3.6) the terminal to be paired and said user account if the address of said other terminal coincides with said public address.

9 Claims, 4 Drawing Sheets

Figure 1:
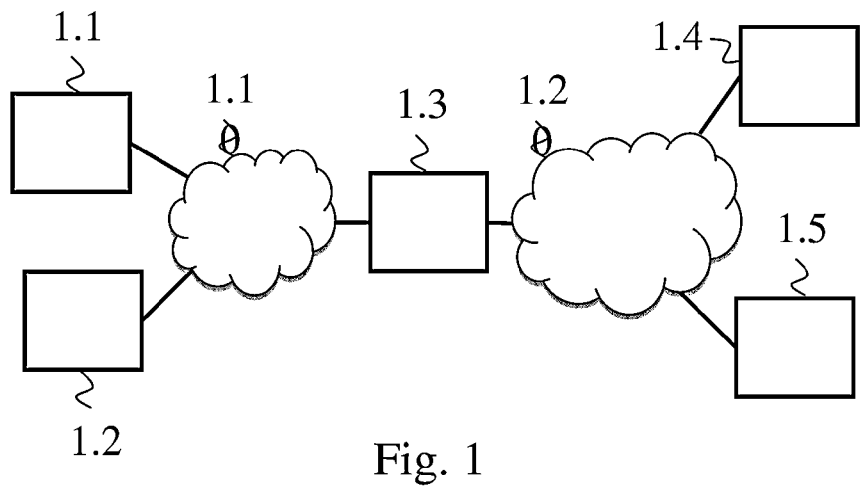

(58) Field of Classification Search
USPC .......................................................... 709/227
See application file for complete search history.

(56) References Cited

U.S. PATENT DOCUMENTS

| | | | | |
|---|---|---|---|---|
| 2006/0168164 A1* | 7/2006 | Lemson | ............... | G06Q 10/107 709/221 |
| 2006/0277548 A1* | 12/2006 | Abe | ...................... | G06F 9/4843 718/104 |
| 2008/0045187 A1* | 2/2008 | Sicart | ................ | H04L 29/12009 455/414.1 |
| 2008/0301215 A1* | 12/2008 | Wang | ............... | H04L 29/12509 709/201 |
| 2009/0172143 A1* | 7/2009 | Ishimoto | ............. | H04L 12/2424 709/223 |
| 2010/0005136 A1* | 1/2010 | Ferlitsch | ........... | G06F 17/30876 709/203 |
| 2011/0047479 A1* | 2/2011 | Ghosh | .................. | G06Q 10/109 715/747 |
| 2011/0200009 A1* | 8/2011 | Takeda | ................ | H04L 61/2575 370/331 |
| 2011/0231407 A1* | 9/2011 | Gupta | ............. | H04M 1/274583 707/748 |

OTHER PUBLICATIONS

International Search Report for PCT/EP2011/069461, mailed Jan. 12, 2012.
French-language Written Opinion of the International Searching Authority for PCT/EP2011/069461, mailed Jan. 12, 2012.
Boulton Ubiquity Software Corporation J Rosenberg Cisco Systems G Camarillo Ericsson C: "Best Current Practices for NAT Traversal for SIP; draft-ietf-sipping-nat-scenarios-03.txt", vol. sipping, No. 3, (Oct. 24, 2005), 45 pages.

* cited by examiner

METHOD AND DEVICE FOR PAIRING A TERMINAL AND A USER ACCOUNT

This application is the U.S. national phase of International Application No. PCT/EP2011/071230, filed 29 Nov. 2011, which designated the U.S. and claims priority to FR Application No. 1060051, filed 3 Dec. 2010, the entire contents of each of which are hereby incorporated by reference.

The present invention concerns the pairing of a terminal, referred to as terminal to be repaired, and a user account for a service implemented by at least one device connected to a first communication network, said terminal to be paired being connected via a second communication network to a gateway that interconnects the first and second communication networks.

In the context of services such as document archiving services, there exist solutions that enable putting a user terminal in relationship with a user account defined with these services. For example, such a service enables storing documents on mass-memory servers accessible via the Internet. These documents are for example digitised paper documents, photographs, or even videos, and the user terminals are for example respectively of the scanner type, of the photographic apparatus type or of the camera type.

The user account enables a user to access these services, for example via a web browser. It enables him for example to access documents that he has archived from his user terminal and to manipulate them. The user generally accesses this account via a personal computer (PC), a tablet personal computer or other terminal provided with a web browser. This terminal is then distinct from the user terminals that supply data to be processed by the services, such as those that have generated archived documents, which for their part do not enable easily manipulating the archived documents.

It is then practical for the user to be able to transfer these documents to such servers, directly from these user terminals. Such terminals are generally provided respectively with at least one network interface supporting the Internet protocol (IP), such as interfaces complying with IEEE 802.3, better known by the name Ethernet, or IEEE 802.11, better known by the name WiFi (registered trademark), and which enable accessing the Internet through a residential gateway. The data to be processed by the services are then transmitted to at least one device using the services concerned, such as a mass-memory server, by means for example of a transmission control protocol (TCP), defined by the documents RFC 791 and 793.

In order to be able to benefit from these services, directly from user terminals, it is necessary to pair each user terminal with the concerned user account. One method consists of requiring the user to enter the serial number of the terminal in a reserved space of his user account. This operation may prove to be tedious and subject to entry errors, and consequently be expensive in terms of technical support.

It is desirable to overcome these various drawbacks of the prior art.

It is in particular desirable to provide a solution that allows, in the context of services, pairing a user terminal supplying data with a user account from which these data processed by the service can be consulted, and this transparently for the user.

It is in particular desirable to provide such a solution that is simple to implement.

The invention concerns a method for pairing a terminal, referred to as terminal to be paired, and a user account for a service implemented by at least one device connected to a first communication network, said terminal to be paired being connected via a second communication network to a gateway that interconnects the first and second communication networks by performing an address translation by means of a public address routable over the first communication network. The method is such that said device performs steps of: obtaining said public address; detecting an access to said user account, said access being performed from another terminal, distinct from the terminal to be paired; obtaining the address of said other terminal routable over said first communication network; pairing the terminal to be paired and said user account if the address of said other terminal coincides with said public address.

Thus, the pairing can be performed without the user having to enter in the user account an identifier of the terminal to be paired, such as a serial number.

According to a particular embodiment, the step of obtaining said public address is performed by transmitting said public address by said terminal to be paired in association with an identifier of said terminal to be paired.

Thus, by its action, the terminal to be paired enables the pairing to be performed without a user having to enter in the user account an identifier of the terminal to be paired, such as a serial number, and this without complex and tedious analysis of the frames received by said device from the pairing system.

According to a particular embodiment, the method comprises a step of obtaining, by said terminal to be paired, said public address from a device connected to said first communication network.

Thus, the terminal to be paired can, without any particular protocol development between the gateway and itself, obtain said public address. Residential gateways for connecting a local network to the Internet, available off-the-shelf, can thus be used.

According to a particular embodiment, the pairing step is performed by a pairing device, the step of detecting an access to said user account consists of a step of notifying said access by a server to said pairing device, and the method comprises a step of transmitting, by said server, an identifier of said user account and said address of said other terminal.

Thus, it is possible to perform the pairing without a user having to enter in the user account an identifier of the terminal to be paired, such as a serial number, and this while separating the archiving service itself from the management of the terminals to be paired.

According to a particular embodiment, the pairing step comprises a step of searching for said address of said other terminal among a set of public addresses stored by said pairing device and associated respectively with identifiers of terminals to be paired.

According to a particular embodiment, the step of detecting an access to said user account consists of detecting a registration of the user account with said service.

The invention also concerns a pairing device adapted to pair a terminal, referred to as terminal to be paired, and a user account for a service, said pairing device being connected to a first communication network, said terminal to be paired being connected via a second communication network to a gateway that interconnects the first and second communication networks by making an address translation by means of a public address routable over the first communication network. The pairing device is such that it comprises: means for obtaining said public address; means for obtaining the address, routable over said first communication network, of another terminal, distinct from the terminal to be paired, from which access is performed to said user account; means for pairing said terminal to be paired and said user account, said pairing means being implemented if the address of said other terminal coincides with said public address.

Thus, by its action, the pairing device enables the pairing to be performed without a user having to enter in the user account an identifier of the terminal to be paired, such as a serial number.

The invention also concerns a system comprising a pairing device as previously mentioned and means for detecting access to said user account performed from said other terminal.

The invention also concerns a terminal, referred to as terminal to be paired, subject to a pairing with a user account for a service implemented by at least one device connected to a first communication network, said terminal to be paired also being intended to be connected via a second communication network to a gateway that interconnects the first and second communication networks by performing an address translation by means of a public address routable over the first communication network. The terminal to be paired is such that it comprises means for transmitting said public address in association with an identifier of said terminal to be paired.

Thus, by its action, the terminal to be paired enables the pairing to be performed without a user having to enter in the user account an identifier of the terminal to be paired, such as a serial number, and this without complex and tedious analysis of frames received by said device from the pairing system.

According to a particular embodiment, the terminal to be paired comprises means for obtaining said public address from a device connected to said first communication network.

According to a particular embodiment, the terminal to be paired comprises means for initiating a phase of pairing between said terminal to be paired and said user account.

The invention also concerns a computer program that can be stored on a medium and/or downloaded from a communication network in order to be read by a computer system or a processor. This computer program comprises instructions for implementing the method previously mentioned, when said program is executed by a computer system or a processor. The invention also concerns storage means comprising such a computer program.

Figure 2:
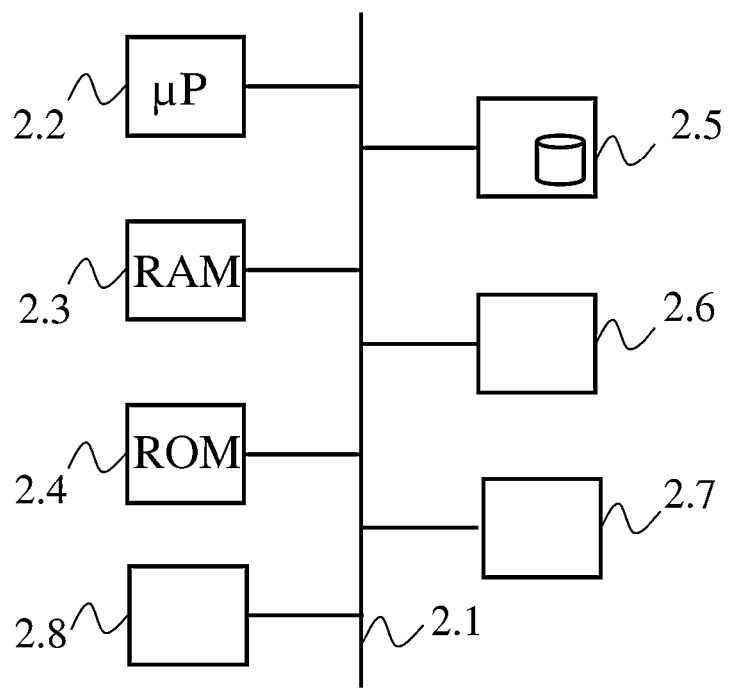
Figure 3:
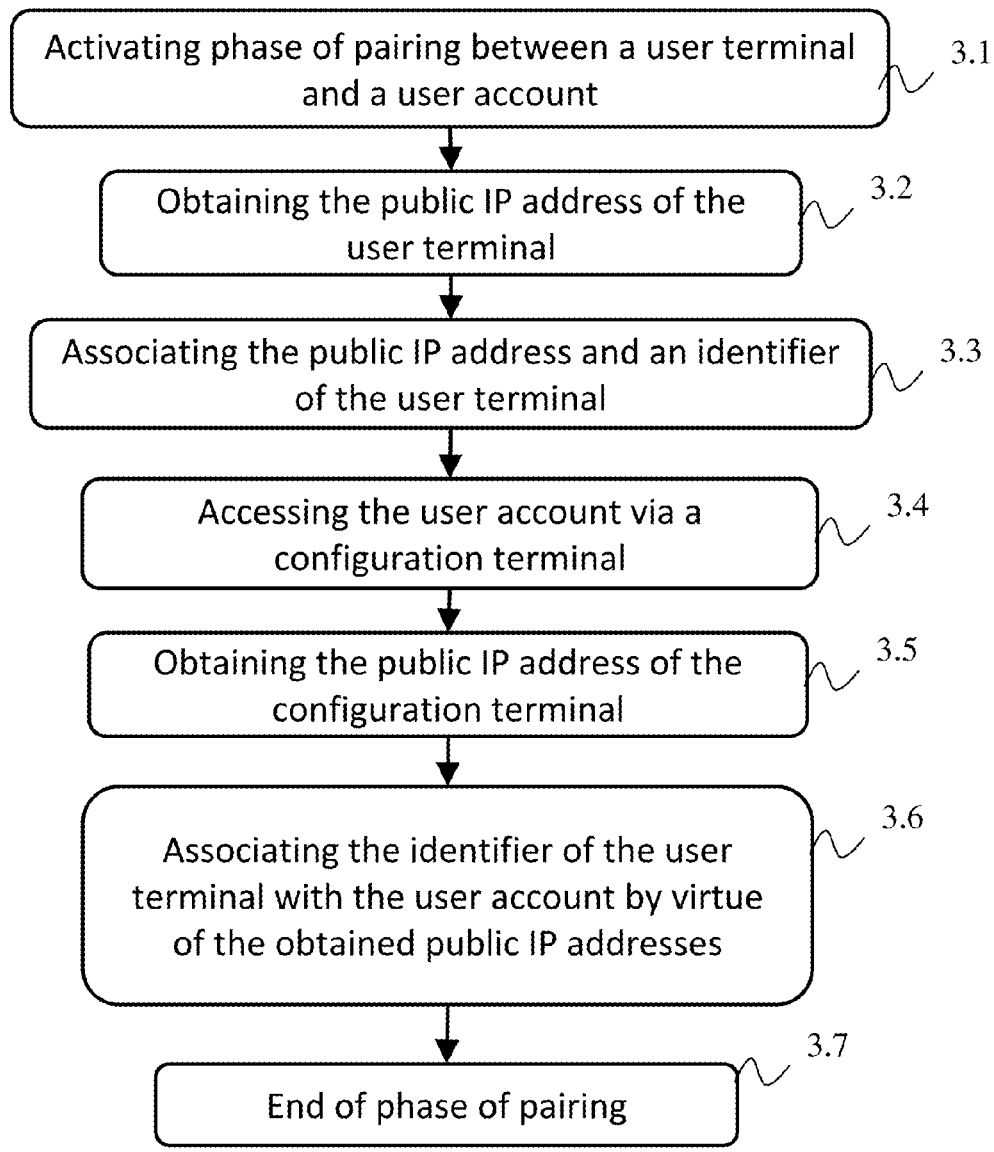
Figure 4:
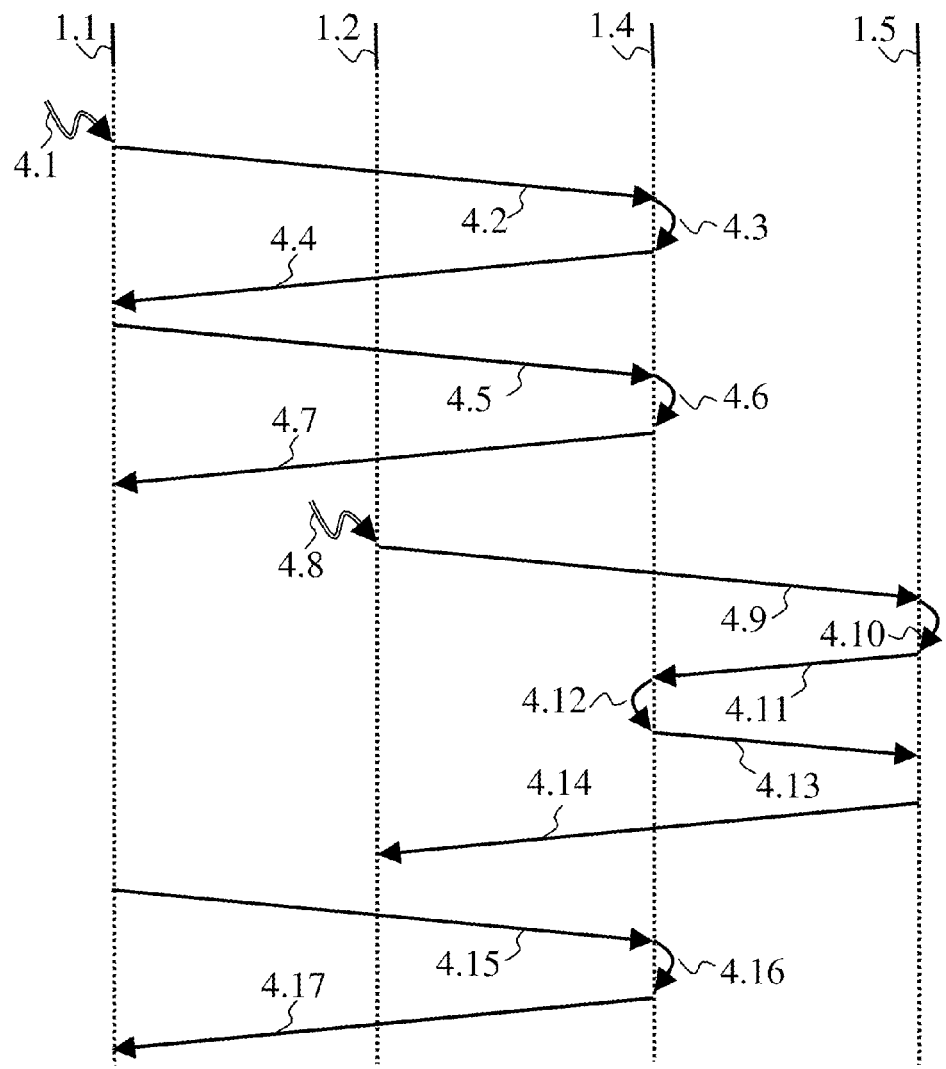
Figure 5:
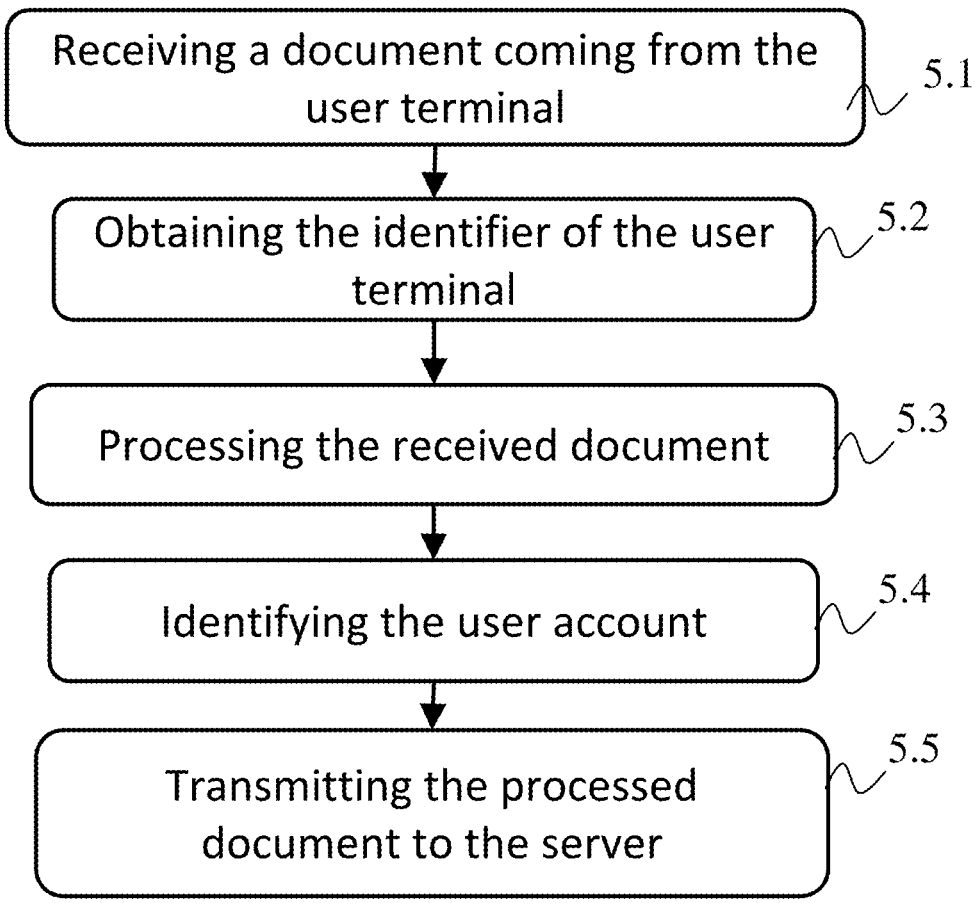

The features of the invention mentioned above, as well as others, will emerge more clearly from a reading of the following description of an example embodiment, said description being given in relation to the accompanying drawings, among which:

FIG. 1 schematically illustrates an embodiment of a service in the context of which the invention can be implemented;

FIG. 2 schematically illustrates an architecture applicable to a terminal to be paired, to a pairing device and to a server, such that can be implemented in the context of the service of FIG. 1;

FIG. 3 schematically illustrates a pairing algorithm, such that can be implemented by the system in FIG. 1;

FIG. 4 schematically illustrates a message exchange sequence, such that can be implemented in the context of the service of FIG. 1, according to one embodiment of the invention;

FIG. 5 schematically illustrates an algorithm for using the service of FIG. 1, in one embodiment of the present invention.

To enable, in the context of services, such as services of archiving documents generated from a user terminal, pairing this user terminal, in a way that is transparent for the user, with a user account from which the data processed by the service can be consulted, it is proposed to identify the user terminal by means of its public IP address, i.e. the one used by a gateway via which the user terminal connects to a network such as the Internet. Next, the user accesses his user account by means of a configuration terminal that uses the same gateway to connect to the network. The configuration terminal then has the same public IP address as the user terminal. This public IP address then enables pairing the user terminal and the user account.

FIG. 1 schematically illustrates an embodiment of a service in the context of which the invention can be implemented.

A user terminal 1.1. is a terminal to be paired with a user account on a server 1.5, such as an archiving server on which documents are intended to be archived. The user terminal 1.1 is for example a scanner used to digitise paper documents, in order to obtain these documents in electronic form. Such a scanner thus generates for example documents in the portable document format (PDF). The user terminal 1.1 may also be a photographic apparatus, a camera or any other apparatus for generating archivable documents in electronic form.

The user terminal 1.1 is connected to a gateway 1.3. This gateway is preferentially a residential gateway, such as an ADSL (Asymmetric Digital Subscriber Line) router via a local network LAN 1.10. This local network may operate according to any type of cabled technology, for example Ethernet, or wireless, for example WiFi. The residential gateway 1.3 enables the user terminal to access the Internet 1.20.

A configuration terminal 1.2 is also connected to the residential gateway 1.3 via the local network 1.10. The residential gateway 1.3 then also enables the configuration terminal 1.2 to access the Internet 1.20. This configuration terminal 1.2 enables the user to access a user account made available to him on the server 1.5 accessible via the Internet 1.20. By means of this user account, the user can subscribe to services offered by the server 1.5, modify parameters relating to the service to which he has subscribed and subsequently access the data supplied by the user terminal and processed by the service, such as for example displaying and manipulating archived documents.

The residential gateway 1.3 implements a function of network address translator (NAT) when the user terminal 1.1 or the configuration terminal 1.2 accesses the Internet. The user terminal 1.1 and the configuration terminal 1.2 use private IP addresses that are not routable over the Internet. In general terms, the NAT function maps each of these private IP addresses used on the local network LAN 1.10 on TCP or UDP ports of the communications established on the Internet by the gateway 1.3 on behalf of devices connected to the local network LAN 1.10. A single public IP address is then used by the gateway 1.3 in order for the user terminal 1.1 and the configuration terminal 1.2 to communicate with other items of equipment via the Internet.

The service is implemented by a system that comprises a pairing device 1.4 connected to the Internet 1.20. The pairing device 1.4 performs the pairing of the user terminal 1.1 with the user account concerned. In the remainder of the description, the pairing device 1.4 is distinct from the server 1.5. In a variant embodiment, the pairing device 1.4 is integrated in the server 1.5.

In a preferred embodiment, a virtual private network (VPN) is established between the user terminal 1.1, the pairing device 1.4 and the server 1.5.

The invention described here more particularly in the context of a local network LAN 1.10 connected to the Internet 1.20 via a gateway can be implemented in a similar manner in the more general context of first and second communication networks interconnected by a gateway effecting an address translation by means of a public address routable over the first communication network, the terminal to be paired being connected to the second communication network.

FIG. 2 schematically illustrates an architecture applicable to the user terminal 1.1, to the pairing device 1.4 and to the server 1.5. Such an architecture comprises, connected by a communication bus 2.1:

- a processor, microprocessor (denoted μP), microcontroller or CPU (Central Processing Unit) 2.2;
- a random access memory (RAM) 2.3;
- a read only memory (ROM) 2.4;
- an interface 2.6 for communicating with the local network LAN 1.10 or with the Internet 1.20, according to circumstances;
- an interface 2.7 to additional functions;
- optionally, according to the circumstances, a storage unit 2.5; and
- optionally, a storage medium reader 2.8, such as a CD-ROM (Compact Disk Read Only Memory) reader.

The interface 2.7 affords access to additional functions, dependent on the considered device, such as for example a man-machine interface function, a function controlling digitisation mechanisms, etc.

The processor 2.2 is capable of executing instructions loaded into the RAM 2.3 from the ROM 2.4, from a storage medium such as a hard disk drive or a CD-ROM, or a communication network. When the communication device is powered up, the processor 2.2 is capable of reading instructions from RAM 2.3 and executing them. These instructions form a computer program that causes the implementation, by the processor 2.2, of all or some of the steps and algorithms described below in relation to FIGS. 3 to 5.

All or some of the algorithms described below in relation to FIGS. 3 to 5 can be implemented in software form by execution of a set of instructions by a programmable machine, such as a DSP (Digital Signal Processor) or a microcontroller, or be implemented in hardware form by a machine or a dedicated component, such as an FPGA (Field-Programmable Gate Array) or an ASIC (Application Specific Integrated Circuit).

FIG. 3 schematically illustrates a pairing algorithm such as can be implemented in the context of the service of FIG. 1.

In a step 3.1, a phase of pairing between the user terminal 1.1 and the user account for the services is activated, or initiated. At least one embodiment of this step is presented below in relation to step 4.1 of FIG. 4.

In a following step 3.2, the public IP address of the user terminal 1.1 is obtained by the pairing device 1.4. At least one embodiment of this step is presented below in relation to the succession of steps 4.2 to 4.5 of FIG. 4.

In a following step 3.3, the pairing device 1.4 associates this public IP address and an identifier of the user terminal 1.1.

In a following step 3.4, the user uses the configuration terminal 1.2 to access his user account with the services. The user activates in his user account a mechanism that further performs the pairing on the user account side. In a preferred embodiment, this mechanism is activated when the user subscribes to a service, i.e. when registering the user account with a service implemented by the server 1.5. The pairing device 1.4 detects this access to the user account, for example by a dedicated notification that is transmitted to it by the server 1.5.

In a following step 3.5, the public IP address of the user terminal 1.1, via which the user currently accesses his user account, is obtained by the pairing device 1.4. At least one embodiment of this step is presented below in relation to the succession of steps 4.9 to 4.11 of FIG. 4.

In a following step 3.6, the pairing device 1.4 performs the pairing of the user terminal 1.1 with the user account, by means of the public IP addresses obtained during the steps 3.2 and 3.5. Such a pairing can in fact be effected since firstly the pairing device 1.4 has a correspondence between the identifier of the user terminal 1.1 and its public IP address, and a correspondence between the user account and the public IP address of the configuration terminal 1.2 with which the user has accessed the user account. As these public IP addresses coincide, since the user terminal 1.1 and the configuration terminal 1.2 are connected to the same local network LAN 1.10, the pairing device 1.4 has the necessary correspondence information for pairing the user terminal 1.1 and the user account.

In a following step 3.7, the pairing phase ends.

FIG. 4 schematically illustrates a message exchange sequence, such as can be implemented in the context of the service of FIG. 1, according to one embodiment of the invention.

In a step 4.1, the pairing phase mentioned at step 3.1 is activated. To do so, the user terminal 1.1 comprises means for initiating this pairing phase. It is for example initiated by the user pressing on a dedicated button of the user terminal 1.1. In a variant embodiment, it can be initiated automatically by the user terminal 1.1 when the latter is connected for the first time to the local network LAN 1.10.

In a following step 4.2, the user terminal 1.1 transmits to the pairing device 1.4 a request in accordance with the STUN (Simple Traversal of UDP through NATs) standard, described in the documents RFC 3489 and RFC 5389. In a following step 4.3, the pairing device 1.4 determines the IP address of the user terminal 1.1, as it appears in the source IP address field of the request sent by the user terminal 1.1 and modified by the residential gateway 1.3. In a following step 4.4, the pairing device 1.4 transmits to the user terminal 1.1 a message containing the IP address determined in the step 4.3. In order to be able to exchange messages with the pairing device 1.4, the user terminal 1.1 is aware of the IP address, routable over the Internet 1.20, of the pairing device 1.4. This IP address can be preconfigured, for example in factory or by an installing technician, in a dedicated memory area of the user terminal 1.1.

To implement the steps 4.2 to 4.4, a server in accordance with the STUN standard is used in the pairing device 1.4 and a client in accordance with the STUN standard is implemented in the user terminal 1.1. The STUN server receives requests coming from the STUN client. In response to each of these requests, the STUN server transmits a message to the STUN client, this message containing the source IP address of the concerned request, meaning that of the user terminal 1.1, such as known outside the local network LAN 1.10. In other words, the STUN server transmits, in a useful data field of this message, the public IP address used by the residential gateway 1.3.

In a variant embodiment, the STUN server is distinct from the pairing device 1.4.

In another variant embodiment, an HTTP (HyperText Transfer Protocol) server is used instead of the STUN server and an HTTP client is used instead of the STUN client. In the same way, the HTTP server determines the source IP address of the request sent by the HTTP client and modified by the residential gateway 1.3.

In yet another variant embodiment, the pairing device 1.4 determines the public IP address of the user terminal 1.1 by analysing messages exchanged when the VPN network is used between the pairing device 1.4 and the user terminal 1.1. In the same way, the source IP address of the messages received from the user terminal 1.1 contains the sought public IP address.

In a following step 4.5, the user terminal 1.1 transmits to the pairing device 1.4 a message, called presenceRequest, comprising, in a useful data field, the public IP address that is received during the step 4.4, further in association with a unique identifier of the user terminal 1.1. This unique identifier, called boxID, is loaded in factory when the user terminal 1.1 is manufactured and cannot be modified. To prevent it being able to be easily obtained by analysis of the content of the user terminal 1.1, this identifier is preferentially stored in an encrypted manner, for example using encryption of the SHA-1 (Secure Hash Algorithm-1) type designed by the National Security Agency (NSA) of the United States. The public IP address and the identifier boxID may be transmitted in association in the same message or in separate messages.

Preferentially, unlike the messages in accordance with the STUN standard, the message sent during the step 4.5 is transmitted in a secure manner, for example by use of the Transport Layer Security (TLS) protocol defined by the document RFC 4346.

In a following step 4.6, the pairing device 1.4 stores the information, public IP address and boxID, contained in the message transmitted during the step 4.5. In a following step 4.7, it acknowledges receipt of the message presenceRequest to the user terminal 1.1. The user is preferentially advised of this receipt acknowledgement. For example, the user terminal 1.1 displays a corresponding icon on a screen or switches on an indicator light.

In a following step 4.8, the user accesses his user account with the server 1.5 via the configuration terminal 1.2. The configuration terminal 1.2 then sends, in a step 4.9, a request to the server 1.5. For example, this request corresponds to a registration of the user with the service. As it is modified by the residential gateway 1.3, in the same way as the messages intended for the Internet 1.20 transmitted by the user terminal 1.1, this request contains the public IP address of the configuration terminal 1.2. As already mentioned, this public IP address is the same as that of the user terminal 1.1, as obtained by the pairing device 1.4 during the step 4.6. During a following step 4.10, the server 1.5 obtains this public IP address as well as an identifier of the user account, called userID. The server 1.5 next transmits to the pairing device 1.4, in a step 4.11, a message subscribeRequest containing, in a useful data field, this public IP address and this identifier of the user account.

In a following step 4.12, the pairing device 1.4 can perform the pairing of the user terminal, identified by the identifier boxID, with the user account, identified by the identifier userID. To do this, it seeks, in a set of IP addresses associated with respective identifiers of terminals to be paired, the identifier boxID that is associated with the public IP address that coincides with the one associated with the identifier userID received in the step 4.11. Once found, the identifier boxID is then stored in correspondence with the identifier userID. Other identifiers can also be stored during this procedure, such as a service identifier and/or an identifier of a supplier of the service, to enable a user to create user accounts with several service providers.

During a following step 4.13, the pairing device 1.4 transmits, to the server 1.5, an acknowledgement containing an indication of success or failure of the pairing operation performed in the step 4.12. This indication is transmitted, during a following step 4.14, from the server 1.5 to the configuration terminal 1.2, for displaying the result to the user.

An error situation may arise if the user does not perform the action described in relation to the step 4.11 before performing the one described in relation to the step 4.8. Another error situation may arise if the user does not perform the action described in relation to the step 4.8 in a predefined time period as from the step 4.1. This is because some providers of access to the Internet 1.20 dynamically attribute the IP addresses to their gateways. Thus, it may happen that the public IP address used for the devices connected to the local network LAN 1.10 is changed over time and that consequently the pairing of the step 4.12 cannot be performed. It is then necessary to reiterate the message exchange sequence as from the step 4.1.

To take into account the fact that some providers of access to the Internet 1.20 dynamically attribute the IP addresses to their gateways, the pairing device 1.4 preferably implements a mechanism for managing lapsing of the information stored in the step 4.6. Thus, each item of information stored during this step is associated with a lapsing instant, and this information is deleted when the pairing device 1.4 finds that the lapsing instant has passed.

In the same way, the pairing device 1.4 preferably implements a mechanism for overwriting the data stored in the step 4.6 if it receives a new message presenceRequest which contains an identifier boxID already stored but which has not yet been subject to effective pairing.

In a following step 4.15, the user terminal 1.1 transmits requests for parameterising the service relating to the pairing of the user terminal 1.1 and the user account. These requests are processed by the pairing device 1.4 in a following step 4.16. The pairing device 1.4 then returns in response, in a following step 4.17, an acknowledgement of the request transmitted in the step 4.15.

The step 4.15 can be triggered at regular intervals by the user terminal 1.1 after execution of the step 4.7. Thus, as long as the pairing is not actually performed in the step 4.12, the pairing device 1.4 returns an error code during the step 4.17. The steps 4.15 to 4.17 are then reiterated until the acknowledgement transmitted during the step 4.17 no longer contains an error code, or the user interrupts the exchanges by activating a dedicated command on a control panel of the user terminal 1.1. In a variant embodiment, the step 4.15 is triggered by the user by activating a dedicated command on the control panel of the user terminal 1.1.

FIG. 5 schematically illustrates an algorithm for using the service, as can be implemented by the pairing device 1.4, once the pairing of the user terminal 1.1 and the user account has been done. The pairing device 1.4 in this context acts as an intermediary between the user terminal 1.1 and the server 1.5.

The algorithm of FIG. 5 is implemented in the context of a document archiving service, but may be implemented in other types of service adapted to process data supplied by user terminals, such as the user terminal 1.1.

In a step 5.1, the pairing device 1.4 receives a document coming from the user terminal 1.1. In association with this document, the user terminal 1.1 supplies to the pairing device 1.4 its identifier boxID. The pairing device 1.4 obtains this identifier in a following step 5.2. In a following step 5.3, the pairing device 1.4 performs a processing on the document received. Such processing may for example consist of reframing the document, when the latter is an electronic version of a paper document digitised by a scanner, or retouching it when the document is a digital photograph. In a following step 5.4, the pairing device 1.4 identifies the user account of the service that was subject of pairing with the user terminal identified by the identifier boxID.

In a variant embodiment, the steps 5.3 and 5.4 are reversed.

In a following step 5.5, the pairing device 1.4 transmits to the server 1.5 the document processed in the step 5.3. The document is thus transmitted for archiving in association with the user account identifier obtained in the step 5.4.

The user can then access the document thus processed and archived from a terminal giving him access to the services, for example a terminal having a web browser, by means of his user account. This terminal is then not necessarily connected to the local network LAN 1.10 where the user terminal 1.1 that transmitted the document for archiving is connected.

The invention claimed is:

1. A method for pairing a terminal, referred to as terminal to be paired, and a user account for a service implemented by a device connected to a first communication network, the method being implemented by at least one pairing device connected to the first communication network, said terminal to be paired being connected via a second communication network to a gateway that interconnects the first and second communication networks by performing an address translation by means of a public address routable over the first communication network, wherein said pairing device performs:
   obtaining, via a received request in accordance with Simple Traversal of UDP through NATs (STUN) or HyperText Transfer Protocol (HTTP) standard, said public address of the terminal to be paired and a unique identifier of the terminal to be paired;
   associating the public address of the terminal to be paired and the unique identifier of the terminal to be paired with a lapsing instant;
   deleting the public address of the terminal to be paired and the unique identifier of the terminal to be paired when the lapsing instant has passed;
   when receiving a message with a new public address of the terminal to be paired and the unique identifier of the terminal to be paired, overwriting the public address associated with the unique identifier of the terminal to be paired with the new public address, the new public address becoming the public address associated with the unique identifier of the terminal to be paired, detecting an access to said user account, said access being performed from another terminal, distinct from the terminal to be paired,
   obtaining the public address of said other terminal routable over said first communication network;
   pairing the terminal to be paired and said user account by pairing the identifier of the terminal to be paired with an identifier of the user account, when the obtained public address of said other terminal coincides with said obtained public address of the terminal to be paired; and, when further receiving a document associated with a unique identifier from a terminal:
   identifying a user account of the service that was subject of pairing with the terminal identified by the received unique identifier; and, transmitting to the device implementing the service the received document for archiving in association with the identified user account.

2. The pairing method according to claim 1, wherein obtaining said public address is performed by transmitting by said terminal to be paired said public address in association with an identifier of said terminal to be paired.

3. The pairing method according to claim 2, wherein said method comprises obtaining, by said terminal to be paired, said public address from a device connected to said first communication network.

4. The pairing method according to claim 1, wherein pairing is performed by a pairing device, wherein detecting an access to said user account consists of notifying said access by a server to said pairing device, and wherein said pairing method further comprises transmitting, by said server, an identifier of said user account and said address of said other terminal.

5. The pairing method according to claim 4, wherein pairing comprises seeking, among a set of public addresses stored by said pairing device and associated respectively with identifiers of terminals to be paired, said address of said other terminal.

6. The pairing method according to claim 1, wherein detecting an access to said user account consists of detecting a registration of the user account to said service.

7. A pairing device adapted to pair a terminal, referred to as terminal to be paired, and a user account for a service implemented by a device connected to a first, communication network, said pairing device being connected to the first communication network, said terminal to be paired being connected via a second communication network to a gateway that interconnects the first and second communication networks by performing an address translation by means of a public address mutable over the first communication network, wherein said pairing device is configured for:
   obtaining, via a received request in accordance with Simple Traversal of UDP through NATs (STUN) or HyperText Transfer Protocol (HTTP) standard, said public address of the terminal to be paired and a unique identifier of the terminal to be paired;
   associating the public address of the terminal to be paired and the unique identifier of the terminal to be paired with a lapsing instant;
   deleting the public address of the terminal to be paired and the unique identifier of the terminal to be paired when the lapsing instant has passed;
   when receiving a message with a new public address of the terminal to be paired and the unique identifier of the terminal to be paired, overwriting the public address associated with the unique identifier of the terminal to be paired with the new public address, the new public address becoming the public address associated with the unique identifier of the terminal to be paired, detecting an access to said user account, said access being performed from another terminal, distinct from the terminal to be paired;
   obtaining the public address, mutable over said first communication network, of another terminal, distinct from the terminal to be paired, from which an access is performed to said user account;

pairing the terminal to be paired and said user account by pairing the identifier of the terminal to be paired with an identifier of the user account, when the obtained public address of said other terminal coincides with said obtained public address of the terminal to be paired; and, when further receiving a document associated with a unique identifier from a terminal:

identifying a user account of the service that was subject of pairing with the terminal identified by the received unique identifier; and, transmitting to the device implementing the service the received document for archiving in association with the identified user account.

8. A non-transitory storage medium storing a computer program comprising instructions for implementing, by a pairing device using a service, and when said program is executed by a processor of said pairing device, a method for pairing a terminal, referred to as terminal to be paired, and a user account for a service implemented by at least one device connected to a first communication network, said terminal to be paired being connected via a second communication network to a gateway that interconnects the first and second communication networks by performing an address translation by means of a public address mutable over the first communication network, wherein said method comprises:

obtaining, via a received request in accordance with Simple Traversal of UDP through NATs (STUN) or HyperText Transfer Protocol (HTTP) standard, said public address of the terminal to be paired and a unique identifier of the terminal to be paired;

associating the public address of the terminal to be paired and the unique identifier of the terminal to be paired with a lapsing instant;

deleting the public address of the terminal to be paired and the unique identifier of the terminal to be paired when the lapsing instant has passed;

when receiving a message with a new public address of the terminal to be paired and the unique identifier of the terminal to be paired, overwriting the public address associated with the unique identifier of the terminal to be paired with the new public address, the new public address becoming the public address associated with the unique identifier of the terminal to be paired, detecting an access to said user account, said access being performed from another terminal, distinct from the terminal to be paired;

obtaining the public address of said other terminal routable over said first communication network;

pairing the terminal to be paired and said user account by pairing the identifier of the terminal to be paired with an identifier of the user account, when the obtained public address of said other terminal coincides with said obtained public address of the terminal to be paired; and, when further receiving a document associated with a unique identifier from a terminal:

identifying a user account of the service that was subject of pairing with the terminal identified by the received unique identifier; and transmitting to the device implementing the service the received document for archiving, in association with the identified user account.

9. A system comprising: a gateway interconnecting first and second communication networks; a terminal connected to the gateway via the second communication network; a pairing device according to claim 7, adapted to pair said terminal.

\* \* \* \* \*